United States Patent [19]

Tanaka et al.

[11] Patent Number: 5,295,022
[45] Date of Patent: Mar. 15, 1994

[54] TRACKING CONTROL CIRCUIT

[75] Inventors: Norio Tanaka; Takato Narita, both of Kanagawa, Japan

[73] Assignee: Sony Corporation, Japan

[21] Appl. No.: 864,938

[22] Filed: Apr. 7, 1992

[30] Foreign Application Priority Data

Apr. 11, 1991 [JP] Japan .................................. 079001

[51] Int. Cl.⁵ ............................................ H04N 5/78
[52] U.S. Cl. ................................ 360/14.2; 360/77.13
[58] Field of Search ............................. 360/77.13, 142

[56] References Cited

U.S. PATENT DOCUMENTS

| | | | |
|---|---|---|---|
| 4,197,564 | 4/1980 | Ravizza | 360/77.17 |
| 4,229,773 | 10/1980 | Sakamoto | 360/77.13 X |
| 4,404,601 | 9/1983 | Sakamoto | 360/77.13 |
| 4,412,259 | 10/1983 | Hiraguri | 360/77.13 X |
| 4,447,835 | 5/1984 | Smith | 360/14.2 X |
| 4,777,543 | 10/1988 | Nishijima et al. | 360/77.13 X |
| 5,107,381 | 4/1992 | Mitsuhashi et al. | 360/77.13 X |
| 5,119,246 | 6/1992 | Tomitaka | 360/77.13 X |

*Primary Examiner*—Richard E. Gluck
*Attorney, Agent, or Firm*—Ronald P. Kananen

[57] ABSTRACT

A tracking control circuit for use in a composite digital video tape recorder, wherein the phase of a control signal is adjusted on the basis of a reproduced envelope signal in an interval of low correlativity to recorded contents out of the composite digital video signal reproduced by a recording head, so that the tracking position of the recording head relative to a video track is controlled to a predetermined proper position. In this circuit, accurate tracking control can be achieved at enhanced precision without enlarging the circuit scale or increasing the production cost.

16 Claims, 3 Drawing Sheets

TRACKING CONTROL CIRCUIT

BACKGROUND OF THE INVENTION

1. Field of the Invention

The present invention relates to a tracking control circuit for use in a composite digital VTR (video tape recorder) or the like, and more particularly to a control circuit for tracking in an edit mode.

2. Description of the Prior Art

It is generally customary that tracking control in a recording apparatus such as a VTR is performed on the basis of a reproduced envelope signal which represents the amplitude of a reproduced output from a playback head. However, since the reproduced envelope signal may vary widely depending on the recorded contents, it is impossible to employ such tracking control means in cases where the level variations of the reproduced envelope signal adversely affect tracking control precision.

In executing an insert edit for example, it is necessary to perform edit tracking control which eliminates any positional deviation between a track to be newly recorded and a base track by adjusting the recording head to the base track instead of adjusting the tracking of the playback head. In such edit tracking control, if there is even a slight variation in the level of the reproduced envelope signal, the recording head will fail to follow the base track properly unless the phase of a control signal CTL is adjusted in compliance with such variation.

Therefore it is impossible to achieve proper tracking control in an edit mode by using a reproduced envelope signal whose amplitude level varies depending on the recorded contents.

In an attempt to solve this problem, it has been usual heretofore to adopt a method involving an equivalent circuit in a playback system to reduce level variations of the reproduced envelope signal, or a method involving the prior recording of a pilot signal or the like to obtain a fixed playback level.

However, there are difficulties in effectively suppressing level variations in the reproduced envelope signal by use of an equivalent circuit to minimize the level variation. Another unavoidable disadvantage is the complicated nature of the circuit configuration. Even using the superimposed pilot signal method, the problem of complicating the circuit configuration still remains unsolved since a particular recording/playback system is required.

OBJECT AND SUMMARY OF THE INVENTION

It is an object of the present invention to provide an improved tracking control circuit which is capable of ensuring sufficiently high control precision without the disadvantage of complicating the circuit configuration.

According to one aspect of the present invention, there is provided a tracking control circuit wherein the phase of a control signal is adjusted on the basis of a reproduced envelope signal during an interval of low correlativity of the recorded contents from the composite digital video signal reproduced by a recording head, so that the tracking position of the recording head relative to a video track is controlled to a predetermined proper position.

A video signal recorded on a magnetic tape is reproduced therefrom in a playback mode. In the case of an SMPTE D-2 type composite digital VTR, data having no direct correlation to the recorded contents, such as error-correcting outer code data (OCD), is recorded in a video sector. In the present invention, the amplitude of a reproduced envelope signal may be detected by utilizing such outer code data. Since the outer code data is not concerned with the recorded contents, its playback level is maintained continuously stable.

The reproduced envelope signal is detected by a recording head instead of a playback head. Detection of the reproduced envelope signal by the recording head is performed so that the required tracking control eliminates any deviation between a track to be newly recorded and a base track during an edit tracking adjustment.

The outer code data included in the reproduced envelope signal is supplied to a servo control processor to form a tracking control signal, which serves to control the rotation rate (rotation phase) of a capstan motor in such a manner as to attain a desired positional correlation between the base track and the recording head.

The above and other features and advantages of the present invention will become apparent from the following description which will be given with reference to the illustrative accompanying drawings.

DESCRIPTION OF THE PREFERRED EMBODIMENT

Hereinafter an embodiment of a tracking control circuit according to the present invention will be described in detail with reference to the accompanying drawings. The illustrated embodiment represents an exemplary case where the invention is applied to an SMPTE D-2 type composite digital VTR.

Figure 1:
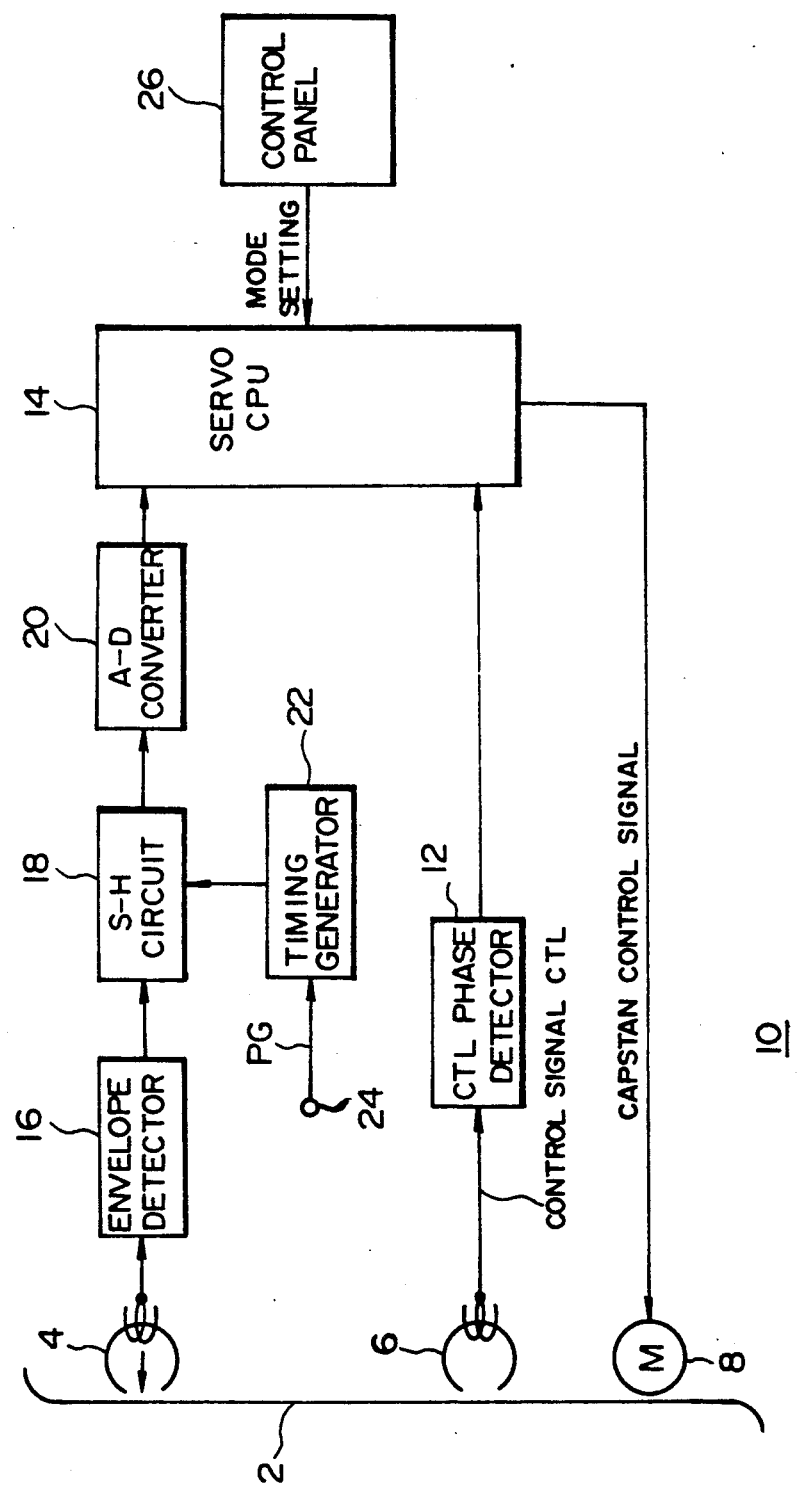
FIG. 1 is a block diagram of an exemplary embodiment of a tracking control circuit according to the present invention.
Figure 2:
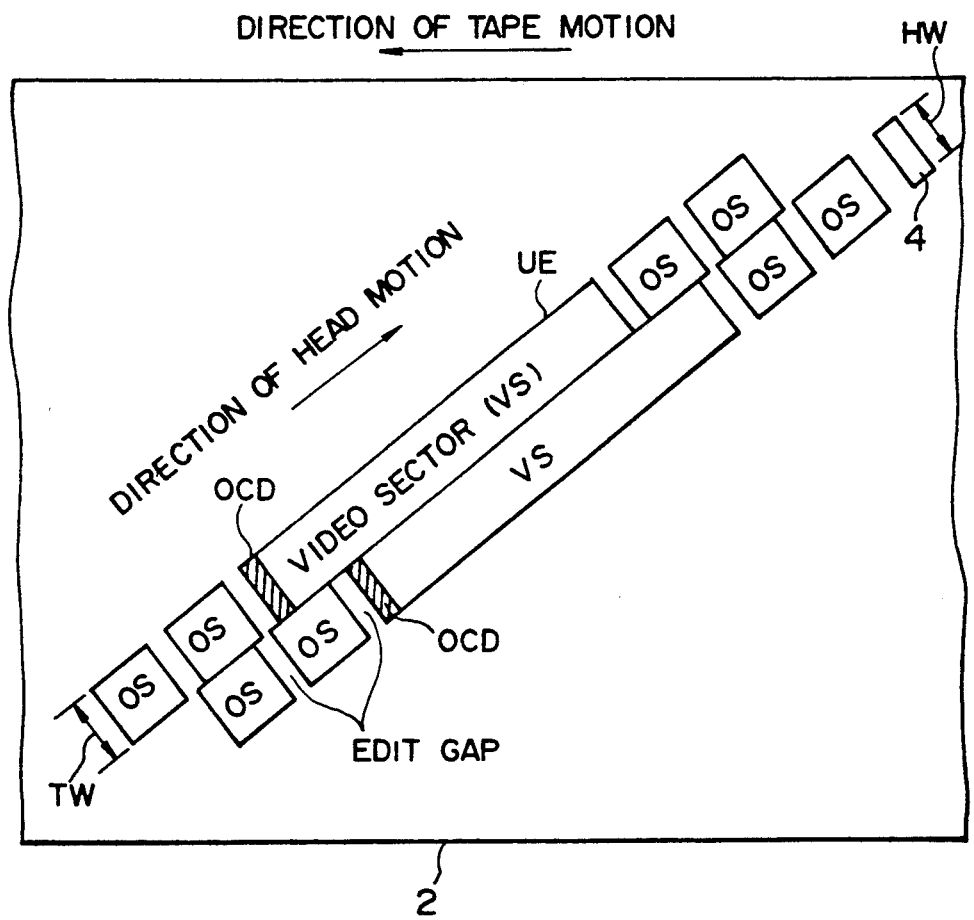
FIG. 2 illustrates a signal pattern in the SMPTE D-2 format.

FIG. 1 is a block diagram of an edit tracking control circuit 10 employed in a composite digital VTR. The VTR uses a magnetic tape 2, on which a digital video signal and a digital audio signal are recorded on inclined tracks in accordance with the SMPTE D-2 type format as illustrated in FIG. 2. (A detailed description will be given later with respect to the signal pattern.)

The VTR also includes a recording head 4, a playback head 6 for reproducing a control signal CTL, and a capstan motor 8. The control signal CTL reproduced by the playback head 6 is supplied to a control signal phase detector 12 so that the phase thereof is detected, and the phase detection output thus obtained is supplied to a servo circuit 14. Meanwhile a capstan control signal from the servo circuit 14 is supplied to the capstan motor 8 so that the phase of the control signal CTL is controlled as desired by the above described control loop.

In the present invention, a reproduced envelope signal detector 16 is connected to the recording head 4, and the digital video signal recorded on the magnetic tape 2 is reproduced in a playback mode by the recording head 4. The circuit reproduces the digital video signal from the recording head 4 and detects the reproduced envelope signal therefrom, since, during edit tracking, proper tracking between a track to be newly recorded on the magnetic tape 2 and the base track already recorded is important and also since tracking must be adjusted in a manner as to maintain the required correlativity therebetween within a predetermined range. In order to meet these requirements, the recording head 4 is used as a playback head at the time of edit tracking control.

The reproduced envelope signal is supplied to a sample-and-hold circuit 18, where the envelope signal obtained during a specific interval with the minimal playback level variation is sampled and held. The signal of the specific interval thus sampled and held is converted to an analog signal by an analog-to-digital converter 20 and then is supplied to the servo circuit 14 to form a capstan control signal, wherein the phase of the capstan motor 8 is controlled so as to maintain a desired positional relationship between a track to be newly recorded and the base track already recorded, i.e., between the recording head 4 and the base track.

The reproduced envelope signal during a specific interval having minimal playback level variations is utilized as a comparison signal for the purpose of eliminating any playback level variations derived from the recorded contents and for averting the playback level variations that may occur depending on the recorded signal, since the recording head 4 is inferior to the playback head with regard to its frequency characteristic. In such case, any amplitude variations resulting from variations in the recorded signal may be erroneously processed as amplitude variations caused by some tracking deviation, and consequently automatic tracking control precision will deteriorate.

In view of these circumstances, the present invention is designed so that a specific interval of the reproduced envelope signal which is minimally affected by the recorded contents is used as a comparison signal. The specific interval will now be described below with reference to FIG. 2.

FIG. 2 illustrates a principal portion of the SMPTE D-2 type signal format where a digital video signal is recorded in the form of inclined tracks. The signal includes a video sector VS and audio sectors OS, respectively. The audio sectors OS are recorded anterior and posterior to the video sector VS with a predetermined edit gap. An outer code data OCD is inserted in a portion of the video sector VS. Since the outer code data OCD is not directly concerned with the recorded contents, its reproduced envelope signal is maintained substantially at a fixed level.

In the embodiment which operates by taking notice of the outer code data OCD, which consists of random data, the reproduced envelope signal is detected during the OCD-insert interval designated as the aforementioned specific interval. For this purpose, a timing signal generator 22 is provided in the sample-and-hold circuit 18 as shown in FIG. 1, so that a sampling signal is output during the interval corresponding to the outer code data OCD insert. For producing such timing signal, a rotation signal (PG signal) is supplied to a terminal 24 from an unshown pulse generator provided on an unshown rotary drum.

The signal during the specific interval, which is substantially free of the harmful influences of the recorded contents, may comprise sync data or edit gap data which is utilizable as well as the aforementioned outer code data OCD.

Figure 3:
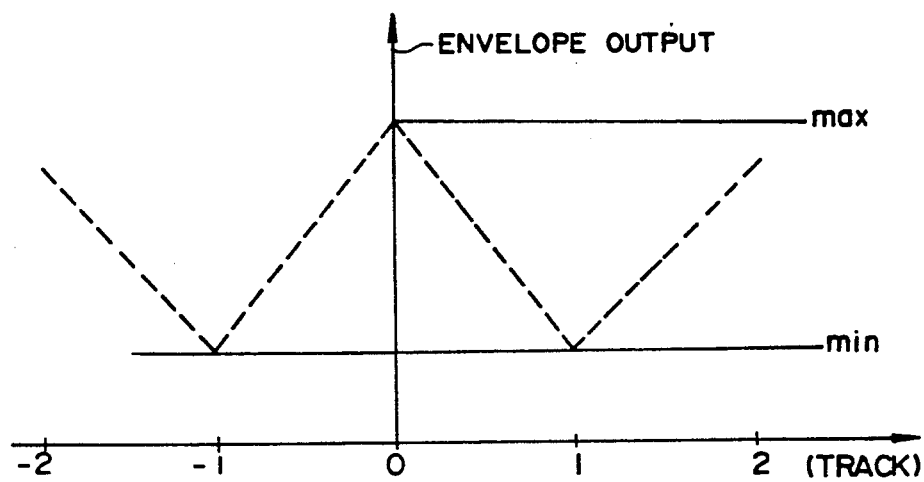
FIG. 3 is a graphical illustration of a measured characteristic for explaining edit tracking control according to the present invention.

Hereinafter an exemplary procedure of edit tracking control will be described in detail. First, as shown in FIG. 3, the phase of the control signal CTL is forcibly shifted from a −2 track position to a +2 track position, and the reproduced envelope signal is measured. The sampling point is coincident with the outer code data OCD recorded at the beginning of the video sector VS as mentioned. The outer code data is sampled and held at a rate of once per track. The envelope signals of 4 tracks are measured at the phase of the same control signal CTL, and the average value of the four data thus obtained is used as the measured data at the phase of the relevant control signal CTL.

Subsequently the phase of the control signal CTL is shifted by 1/16 track, and the same measurement as the above is executed to obtain the next measured data. In this embodiment, such operation is repeated 64 times, and the relationship between the phase of the control signal CTL and the measured data is obtained with respect to +2 and −2 tracks from the fixed center phase. FIG. 3 graphically shows the result of such a measurement. The measured data in every even-numbered track becomes minimum in its center portion because of the fact that no coincidence is attained between the azimuth of the recording head 4 and the recording azimuth of the measured track.

Figure 4:
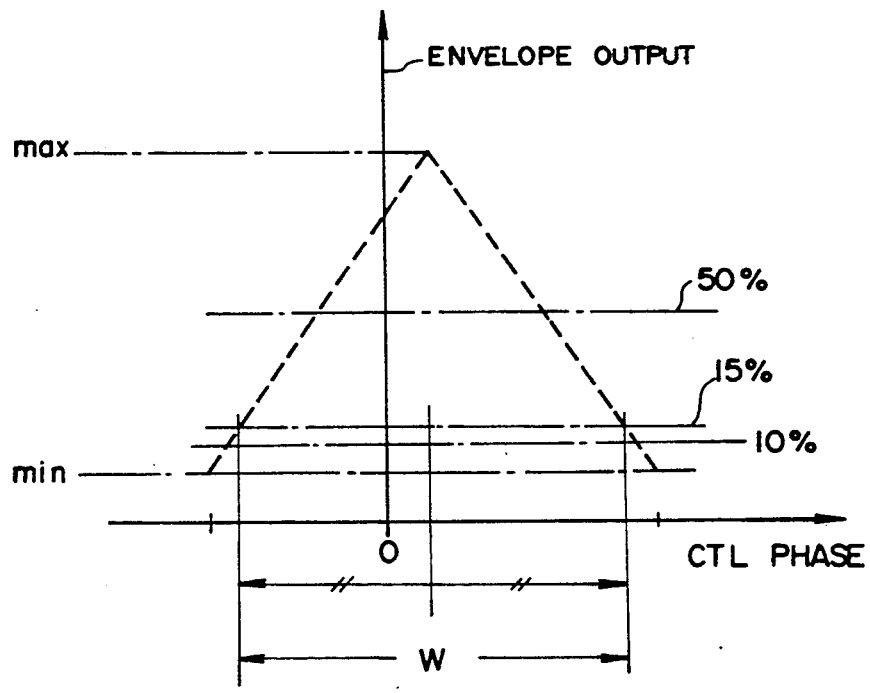
FIG. 4 is a graphical illustration of another measured characteristic for explaining the edit tracking control according to the present invention.

Thereafter the maximum and minimum points of the measured data are calculated, and the points where the output level is under 50% and over 10% are picked up on the basis of the calculated data. FIG. 4 graphically shows the damping characteristic curve determined by calculating, from the measured data thus picked up, the damping characteristics of both edges at the relevant track. This graph represents the result obtained by linear approximation of the measured data.

The phases of the two control signals CTL indicating a 15% output level are calculated from the linear-approximated straight line, and the mid-point therebetween is found. The mid-point phase of the control signal CTL is exactly the phase where a coincidence is attained between the center of the track and the center of the recording head 4. However, since the width HW of the recording head 4 is slightly smaller than the track width TW as shown in FIG. 2, this embodiment is so devised that, in order to properly position the recording head 4 at the upper edge UE of the track (as shown in FIG. 2), the rotation phase of the capstan motor 8 is controlled to cause an offset from the above-described phase by half the difference between the track width TW and the head width HW.

The data measured at the phase of the same control signal CTL is used four times for in order to minimizing any data measurement error that may be derived from data dropout or the like. The reason for using the data having an output level less than 50% of the measured data is based on the necessity to reduce any harmful influences that may be exerted on the measurement precision due to the head sensitivity differences.

After completion of the above edit tracking control, an edit operation such as an insert edit or the like is started. Although this embodiment represents an exemplary case of applying the present invention to a tracking control circuit in an SMPTE D-2 type digital VTR, it is obvious that the present invention is applicable to any other digital VTR as well.

According to the present invention, as described hereinabove, the phase of the control signal CTL is adjusted on the basis of the reproduced envelope signal in an interval of low correlativity to the recorded contents out of the entire composite digital video signal reproduced by a recording head, whereby the tracking position of the recording head to the video track is controlled to a predetermined proper position.

Because tracking control is performed on the basis of the reproduced envelope signal during an interval having low correlativity to the recorded contents, it becomes possible to enhance the tracking control precision to realize highly accurate tracking adjustment. The circuit configuration required for such control is relatively simple, and no special signals, such as a pilot signal, are needed to perform the desired tracking adjustment. Consequently the invention attains the remarkable advantage of realizing proper tracking control without causing any increase in production costs.

It is therefore obvious that the present invention may be advantageously used as an edit tracking control circuit in a composite digital VTR or the like where a high precision is requisite with respect to the positional relationship between a track to be newly recorded and the base track already recorded.

What is claimed is:

1. An improved tracking control circuit for precise tracking during edit mode operation of a recording device having a recording head, a playback head, and a capstan motor, and operable to play from and record on a magnetic tape, said circuit comprising:
    means for detecting the phase of a signal from said playback head;
    a detector, responsive to a signal from said record head, for reproducing an envelope signal indicative of recorded content on said magnetic tape;
    means, responsive to a timing signal, for sampling said envelope signal during a predetermined interval having low correlativity to said recorded content and producing a comparison signal therefrom;
    means, responsive to said phase signal and said comparison signal, for producing a control signal for controlling said capstan motor during edit mode of said recording device.

2. The tracking control circuit according to claim 1, wherein said recording device is a video tape recorded (VTR) and said magnetic tape contains a composite digital video signal.

3. The tracking control circuit according to claim 2, wherein said VTR comprises a SMPTE D-2 type composite digital VTR, and said digital video signal includes a digital video signal and a digital audio signal recorded on said magnetic tape in the form of inclined tracks.

4. The tracking control circuit according to claim 3, wherein said digital video signal includes an error correcting outer code data (OCD) interval, and said predetermined interval corresponds to said OCD interval.

5. The tracking control circuit according to claim 2, wherein said composite video signal includes a sync data interval and said predetermined interval corresponds to said sync data interval.

6. The tracking control circuit according to claim 2, wherein said composite video signal includes an edit gap data interval, and said predetermined interval corresponds to said edit gap data interval.

7. The tracking control circuit according to claim 2, wherein said composite video signal includes a data interval having no correlation to the recorded content on said tape, and said predetermined interval corresponds to said data interval.

8. The tracking control circuit according to claim 1, wherein said means associated with said playback head comprises a phase detector.

9. The tracking control circuit according to claim 1, wherein said detector comprises an envelope detector and said means for sampling comprises a sample and hold circuit responsive to a timing generator.

10. The tracking control circuit according to claim 2, wherein said magnetic tape contains a video track, and said means for producing a control signal comprising a servo control operable to control the tracking position of said recording head in a predetermined position relative to the position of said video track.

11. A method of controlling, during edit mode, the tracking of a recording device operable to play from and record on a magnetic tape having a video track thereon, said recording device having a recording head, a playback head, and a capstan motor, comprising the steps of:
    detecting the phase of a control signal reproduced from said playback head, for controlling said capstan motor;
    generating an envelope signal indicative of recorded video content on said magnetic tap using said recording head;
    sampling said envelope signal during a predetermined time interval having a low correlation with respect to said recorded video content to thereby produce a comparison signal;
    adjusting the phase of said control signal based on said comparison signal, whereby the tracking position of said recording head relative to a video track is controlled to a predetermined position.

12. The method according to claim 11, wherein said recording device is a SMPTE D-2 type composite digital video tape recorder, and said video track includes an error-correcting outer code date (OCD) interval, and said step of sampling comprises sampling said envelope signal during said OCD interval.

13. The method according to claim 11, wherein said video track includes a sync data interval, and said step of sampling comprises sampling said envelope during said sync data interval.

14. The method according to claim 11, wherein said video track includes an edit gap data interval, and said step of sampling comprises sampling said envelope during said edit gap data interval.

15. The method according to claim 12, wherein said step of adjusting comprises controlling the speed of rotation of said capstan motor.

16. The method according to claim 15, wherein said step of adjusting comprises controlling the phase of said capstan motor.

* * * * *